United States Patent
Bressie

[11] Patent Number: 6,068,345
[45] Date of Patent: May 30, 2000

[54] PROTECTIVE WHEEL MASK FOR AUTOMOTIVE TIRE CLEANING

[76] Inventor: Joe L. Bressie, 2648 Leta Mae, Farmers Branch, Tex. 75234

[21] Appl. No.: 09/193,827

[22] Filed: Nov. 17, 1998

[51] Int. Cl.[7] .................................................. B60B 7/00
[52] U.S. Cl. ..................... 301/37.1; 15/257.01; 118/505; 134/123
[58] Field of Search ............................. 134/123; 118/504, 118/505; 301/37.1, 37.42; 15/257.01; 150/166

[56] References Cited

U.S. PATENT DOCUMENTS

| | | | |
|---|---|---|---|
| 2,627,839 | 2/1953 | Hudgins et al. | 118/505 |
| 3,319,687 | 5/1967 | Tomchak | 145/123 X |
| 4,603,915 | 8/1986 | Heintz | 301/37.42 X |
| 4,712,838 | 12/1987 | Berg et al. | 301/37.1 X |
| 4,815,784 | 3/1989 | Zheng . | |
| 4,874,206 | 10/1989 | Sampson | 118/505 X |
| 5,024,262 | 6/1991 | Huang . | |
| 5,131,726 | 7/1992 | Collins | 301/37.42 X |
| 5,423,599 | 6/1995 | Sherod et al. | 301/37.1 |
| 5,435,630 | 7/1995 | Tucker | 301/37.1 |

*Primary Examiner*—Philip R. Coe
*Attorney, Agent, or Firm*—Daniel Rubin

[57] ABSTRACT

A portable wheel mask suitable for position placement in close proximity to the face of a wheel on which a mounted tire is to be cleaned. The mask comprises a flexible but durable body of fabric composition that is collapsible from an open taut relation to a collapsed relation for storage. A handle secured to the backside of the body enables supporting the mask in place while a pocket on the inside surface of the body enables the valve stem of the tire to be received during such time as the mask is being utilized for protecting the wheel face against available forms of tire cleaning products.

5 Claims, 2 Drawing Sheets

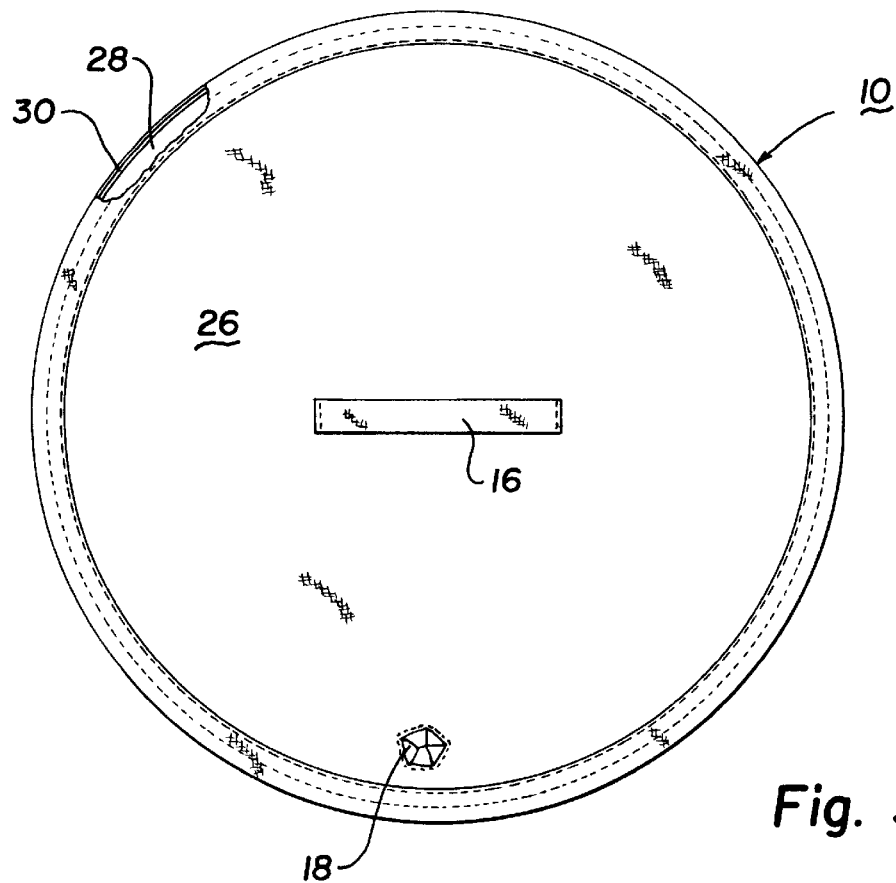
Fig. 3
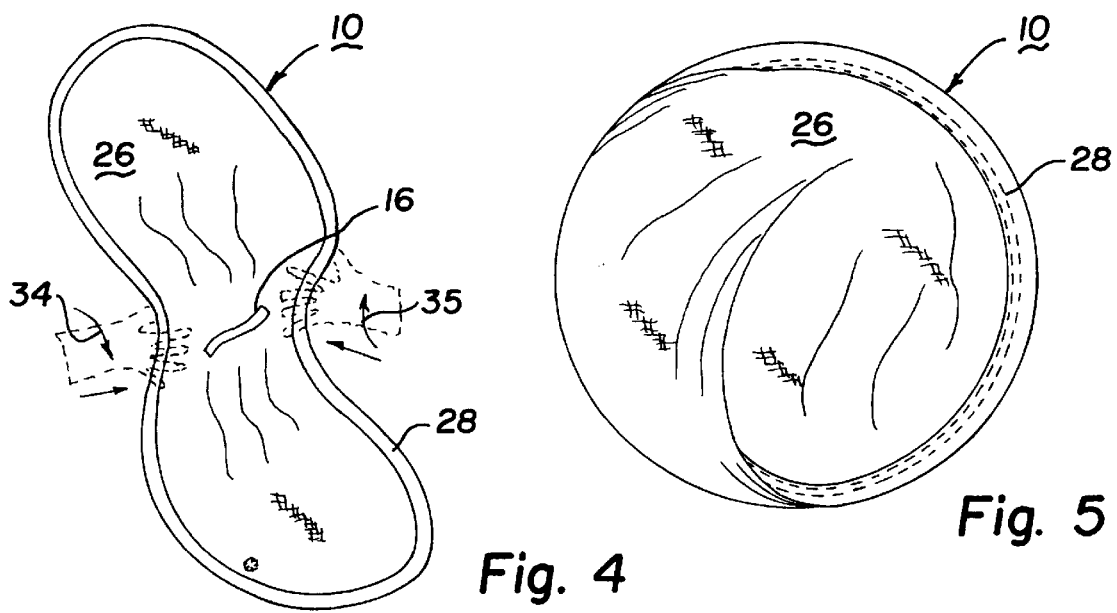
Fig. 4
Fig. 5

PROTECTIVE WHEEL MASK FOR AUTOMOTIVE TIRE CLEANING

FIELD OF THE INVENTION

The field of art to which the invention relates comprises the art of tire maintenance in the auto after-market.

BACKGROUND OF THE INVENTION

The auto after-market has many facets including car clubs and associations dedicated to maintaining cleanliness and appearance of their automobiles. One aspect of cleanliness includes tire appearance whether whitewall or blackwall and which involves frequent use of various commercially available cleaning/aesthetic enhancement products such as cleaning, dressing, etc. (hereinafter collectively termed "cleaning products" or "cleaners") that are sprayed onto the tire surface.

A problem associated with tire cleaning products is that many of the commercial compositions are dispensed in a spray format and yet are known to have a deleterious affect on the metal wheels and/or covers about which the tires are mounted. Many of the wheels are, for example, of magnesium or aluminum and because of the adverse affect that can occur from commercial tire sprays they typically contain a labeled warning for the consumer to avoid contact of the content with the wheels. It is even suggested that permanent damage of the wheels could result.

DESCRIPTION OF THE PRIOR ART

Because of the adverse affect tire cleaning products can have on metal wheels of various compositions, it has become customary, particularly with avid car lovers, to exercise extreme care when cleaning tires or otherwise aesthetically enhancing their appearance. The primary concern has been to avoid wheel contact by the cleaner to the maximum extent possible and quickly wipe off or wash off any overspray on the wheel before damage can occur.

It can be appreciated that the foregoing, while functioning reasonably well, becomes labor intensive and cumbersome, not to mention the dissatisfaction that can result from an accidental overspray. Despite recognition of the problem, a more satisfactory solution has not heretofore been known.

OBJECTS OF THE INVENTION

It is an object of the invention to provide a wheel protector capable of preventing tire cleaner from contacting the wheel face surfaces during the course of tire cleaning.

It is a further object of the invention to effect the previous object with a convenient portable lightweight mask that can conveniently be positioned in close proximity to the wheel face during the course of tire cleaning.

It is a still further object of the invention to effect the previous objects with a mask that is inexpensive to fabricate and yet is capable of being collapsed for ready storage to be available when needed.

SUMMARY OF THE INVENTION

The invention hereof relates to a product for protecting automotive wheels against contact by a tire cleaner composition when tires are being cleaned. More specifically, the invention relates to a light weight collapsible mask which when fully open can be handheld in contact against or in close proximity to the wheel face for preventing cleaner spray being applied onto the tires from contacting the metal surfaces of the wheel face.

The mask is portable and includes a body formed of a nylon composition in a circular configuration that includes an annular hem about its perimeter. Contained within the hem is a relatively rigid but flexible spring wire that serves to maintain a taut circular shape of the mask erect when open. Yet when appropriately twisted the wire can be doubled over to collapse the mask for storage.

A centrally located handle on the rear face of the body enables hand positioning of the mask at the wheel face when spraying. It also allows ready removal from the vicinity of the wheel when spraying has been completed. Optionally included in the mask is a rearward extending pocket recess near the body perimeter for overfitting the valve stem of the tire when the mask is set in place. As a consequence of the foregoing, the mask serves to overcome a long standing problem in the cleaning of automotive tires while at the same time affording an economical solution therefor.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIG. 3 is a frontal elevation partially broken-away of the wheel mask of the invention in its open erect relation;

FIG. 4 is a frontal elevation of the mask of FIG. 3 being collapsed for storage; and FIG. 5 illustrates the mask in its collapsed relation for storage.

DESCRIPTION OF THE PREFERRED EMBODIMENT

Figure 1:
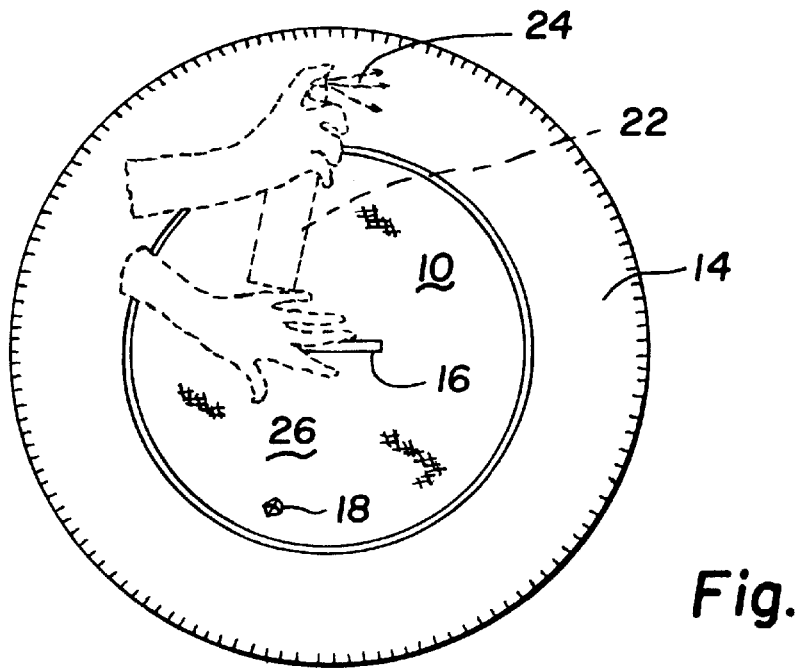
FIG. 1 illustrates manually spraying tire cleaner onto a automotive tire with the wheel mask of the invention in place.

In the description which follows, like parts are marked throughout the specification and drawings with the same reference numerals respectively. The drawing figures are not necessarily to scale and the proportions of certain parts may have been exaggerated for purposes of clarity.

Figure 2:
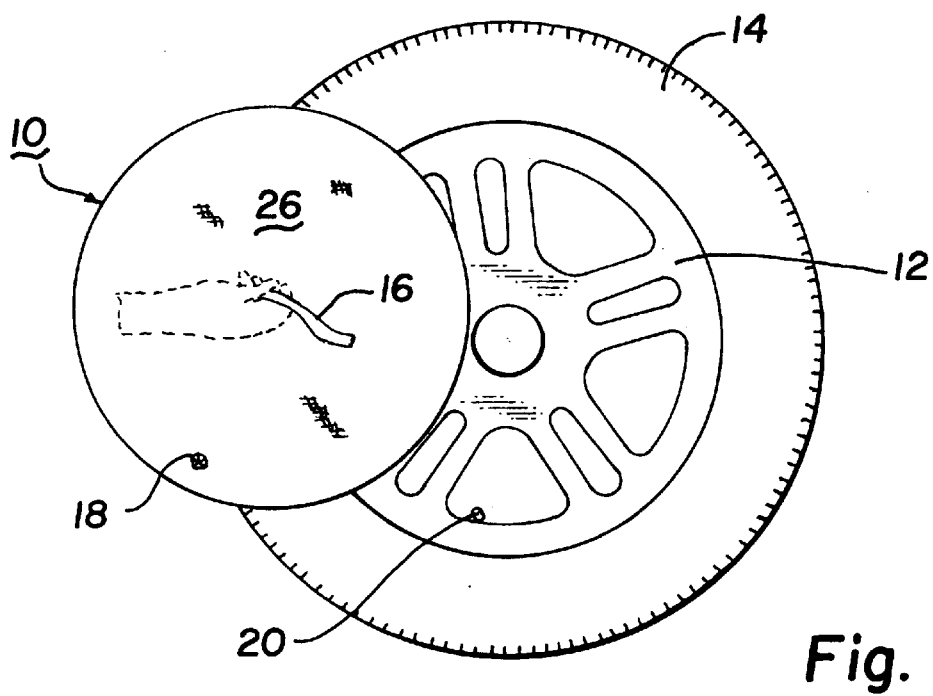
FIG. 2 illustrates portable handling of the mask of the invention for placement and/or removal opposite the metal wheel face of FIG. 1.

Referring now to the drawings, there is illustrated the portable circular mask of the invention hereof, designated 10, for vertical placement against or in close proximity to the face of wheel 12 supporting a tire 14 having a sidewall to be cleaned. The mask includes a central body 26 being handheld via a handle 16 and positioned such that recess pocket 18 is situated over tire stem 20. (FIG. 2)

As shown in FIG. 1, an aerosol canister 22 is being held in the right hand of a person for dispensing spray cleaner 24 onto tire 14 while the left hand is engaging handle 16 for maintaining the mask in place.

The mask is primarily of a flexible but durable fabric composition such as nylon with a total weight on the order of approximately one pound or less. As seen in FIG. 2, the mask is sufficiently portable for being easily placed or removed to or from the masking position of FIG. 1 and sequentially moving it from tire to tire.

As best seen in FIG. 3 the mask, described supra contains a central body portion 26 of a flexible but durable fabric such as nylon or the like. About its annular perimeter, body 26 includes a hem 28 containing a circular extending flexible spring wire 30. The wire serves, when the mask is in its extended open relation, to maintain the body portion taut and fully erect. Yet as seen in FIG. 4, hand gripping the opposite edges of the mask and twisting in the manner of arrows 34 and 35 enables the mask to be collapsed to a much smaller size as illustrated in FIG. 5. The latter being relatively small, can conveniently be stored in the glove compartment of the vehicle, in the trunk or wherever preferred. In any event, it can conveniently be retrieved when required for subsequent tire cleaning. Reversing the twist of FIG. 4 enables the mask to spring into its open and erect position as illustrated in FIG. 3.

By the above description there is disclosed a novel article solving a long standing problem with respect to sidewall cleaning of automotive tires while concomitantly affording protection of the metal wheel per se. Being that the mask hereof is portable and foldable, it can conveniently be brought to the automotive site where it can be expanded to size in order to completely mask the wheel face against any spray of cleaning composition applied to the tire. When open, the mask has a diameter of approximately eighteen inches while when collapsed it has a diameter of approximately seven inches. The latter dimension enables convenient storage in the glove compartment and/or trunk of the vehicle, etc. Being that the mask is constructed of a durable fabric with only a flexible spring wire of approximately 3/16 inch diameter being utilized to maintain the mask in its open erect relation, the number of parts utilized for the product is so minimal as to enable a low fabrication cost. With the cost of manufacture being relatively low, the sale price can likewise be maintained relatively low so as to enable the product to be easily affordable for the vast number of persons having a need or desire to possess a product of that type.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A wheel mask for protecting the wheel face when cleaning automotive tires mounted on the wheel and comprising:

a flexible body reversibly collapsible from an open taut formation in circular configuration of diameter at least comparable to the diameter of the wheel on which the tire is to be cleaned to a substantially smaller formation for purposes of storage; and a handle to enable manually holding said body when said body is in said open taut formation in close proximity to said wheel face for protecting said wheel face against contact of cleaning products applied onto said mounted tire.

2. A wheel mask in accordance with claim 1 in which there is included an annular hem extending about the perimeter of said body and a flexible spring wire extends within said hem and is operable when said body is opened from said collapsed relation to maintain said body firmly taut.

3. A wheel mask in accordance with claim 2 in which said body defines a first surface adapted to confront said wheel face and an opposite second surface facing away from said wheel face and said second surface includes said handle by which to manually hold said body with said first surface in close proximity to said wheel face.

4. A wheel mask in accordance with claim 2 including a pocket defined in said first surface in which to receive the valve stem extending outward from a wheel face being protected.

5. A wheel mask in accordance with claim 1 in which said body when collapsed is of a diameter about 40–50 percent of the open diameter of said body.

\* \* \* \* \*